United States Patent
Moffatt et al.

(12) 
(10) Patent No.: US 6,221,932 B1
(45) Date of Patent: *Apr. 24, 2001

(54) COVALENT ATTACHMENT OF POLYMERS ONTO MACROMOLECULAR CHROMOPHORES BY NUCLEOPHILIC SUBSTITUTION REACTION FOR INKJET PRINTING

(75) Inventors: John R. Moffatt; Joseph W. Tsang, both of Corvallis, OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,892

(22) Filed: Oct. 20, 1998

Related U.S. Application Data

(63) Continuation-in-part of application No. 09/127,539, filed on Jul. 31, 1998.

(51) Int. Cl.[7] ............... C09D 11/02; C09D 11/10; C09D 129/00; C09D 171/02
(52) U.S. Cl. ............. 523/160; 523/161; 106/31.6
(58) Field of Search ............... 523/160, 161; 106/31.6, 31.64, 31.85, 31.89, 31.27, 31.28, 31.75, 31.77, 31.78

(56) References Cited

U.S. PATENT DOCUMENTS

| | | | |
|---|---|---|---|
| 4,381,185 | * 4/1983 | Swanson et al. | 8/506 |
| 4,530,961 | 7/1985 | Nguyen et al. | 524/832 |
| 4,548,968 | 10/1985 | Jaffe | 524/88 |
| 4,597,794 | 7/1986 | Ohta et al. | 106/20 |
| 4,713,411 | 12/1987 | Kanou et al. | 524/560 |
| 4,846,893 | 7/1989 | Akasaki et al. | 106/500 |
| 5,145,524 | * 9/1992 | Ganci | 106/493 |
| 5,281,261 | 1/1994 | Lin | 106/20 R |
| 5,310,887 | * 5/1994 | Moore et al. | 534/729 |
| 5,554,739 | 9/1996 | Belmont | 534/885 |
| 5,571,311 | 11/1996 | Belmont et al. | 106/20 R |
| 5,596,027 | * 1/1997 | Mead et al. | 523/161 |
| 5,630,868 | 5/1997 | Belmont et al. | 106/31.75 |
| 5,667,569 | * 9/1997 | Fujioka | 106/31.58 |
| 5,672,198 | 9/1997 | Belmont | 106/20 R |
| 5,688,317 | 11/1997 | Mackay et al. | 106/476 |
| 5,725,650 | * 3/1998 | Flenniken et al. | 106/476 |
| 5,837,045 | * 11/1998 | Johnson et al. | 106/31.85 |
| 5,922,118 | * 7/1999 | Johnson et al. | 106/31.6 |
| 5,928,419 | * 7/1999 | Uemura et al. | 106/493 |
| 5,952,429 | * 9/1999 | Ikeda et al. | 525/326.1 |

FOREIGN PATENT DOCUMENTS

| | | |
|---|---|---|
| 0098338A1 | 1/1984 | (EP) . |
| 0802247A2 | 10/1997 | (EP) . |
| 1-285464 | * 11/1989 | (JP) . |

* cited by examiner

Primary Examiner—Vasu Jagannathan
Assistant Examiner—Callie E. Shosho
(74) Attorney, Agent, or Firm—Michael D. Jones

(57) ABSTRACT

The present invention relates to ink-jet ink compositions that comprise macromolecular chromophores having functional groups covalently attached for water solubility. Moreover, the MMCs have polymer chains covalently attached to the pigments by nucleophilic substitution to provide enhanced smearfastness, enhanced print quality, improved bleed control, and improved resistance to water when applied to the media. These inks have good viscosity and surface tension, are more soluble in organic solvents and are, therefore, useful in ink-jet printing, including thermal ink jet printing, piezoelectric ink jet printing, and continuous ink jet printing.

20 Claims, No Drawings

COVALENT ATTACHMENT OF POLYMERS ONTO MACROMOLECULAR CHROMOPHORES BY NUCLEOPHILIC SUBSTITUTION REACTION FOR INKJET PRINTING

CROSS-REFERENCE TO RELATED APPLICATIONS

The present application is a continuation-in-part of application Ser. No. 09/127,539, filed Jul. 31, 1998.

TECHNICAL FIELD

The present invention relates to ink-jet ink compositions that comprise pigment particles (macromolecular chromophores) having both functional groups attached for water solubility and polymer chains covalently attached to the pigments by nucleophilic substitution. These pigmented inks have enhanced smearfastness, enhanced print quality, improved bleed control, and improved resistance to water when applied to the media, and are more soluble in organic solvents. Moreover, inks formulated with these polymers are characterized with good viscosity and surface tension and are useful in ink-jet printing, including thermal ink jet printing, piezoelectric ink jet printing, and continuous ink jet printing.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

On operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Ink-jet inks used in thermal ink-jet printing typically comprise a colorant and a vehicle, with the vehicle often containing water and other relatively low surface tension liquids.

There are two general classifications of colorants: dye-base and pigment-based. Dyes have the advantage of being water-soluble. However, problems with dyes include poor waterfastness, poor smearfastness, poor bleed control between colors, and poor lightfastness. Pigments are generally water-insoluble and require a dispersant or other means to make it soluble in water.

Although the relevant art contains many examples of ink-jet ink formulations using these colorants, a need still exists for ink compositions comprising stable, water soluble pigments which provide improved smearfastness, waterfastness, improved print quality, improved bleed control, and optical density.

DISCLOSURE OF INVENTION

In accordance with the invention, an ink-jet ink composition is provided which comprises a colorant that is both water-soluble and contains polymers covalently attached to the colorant by nucleophilic substitution or acylation reactions. The colorants used herein comprise pigment particles, the surface of which are treated with functional groups to provide water-solubility as well as polymers to give exceptional properties in an ink formulation. Such treated pigments are called macromolecular chromophores (MMC). Inks comprising these MMCs are very effective in reducing smear and have increased waterfastness, bleed control, optical density and improved print quality. Bleed control is defined as the invasion of one colored ink printed substantially, simultaneously and adjacently to a second colored ink. Inks containing these MMCs are very effective in reducing smear and has increased waterfastness, optical density and improved print quality. Furthermore, the pigments of this invention are more soluble in organic solvents and provide better bleed control on the print media. The ink may contain further components to aid in providing improved print quality and performance in an ink-jet printer.

Additionally, a method of ink-jet printing which uses the disclosed inks and exploits the inks' properties is provided.

All concentrations herein are in weight percent, unless otherwise indicated. The purity of all components is that employed in normal commercial practice for ink-jet inks. All references are hereby incorporated by reference.

BEST MODES FOR CARRYING OUT THE INVENTION

The MMCs for use in the present ink formula comprises chemical modifications to impart water solubility to the particle. Under typical chemical processes, the resulting surface of the MMC consists of carboxylate, phosphate, and/or sulfonate functionalities for anionic chromophores, and ammonium, quaternary ammonium, or phosphonium functionalities for cationic chromophores.

The MMC colorant particles of the present invention preferably have a useful mean diameter ranging from 0.005 to 12 um. Colorants of this type result from chemical reactions where solvent-accessible functional groups are derivatized to provide solubilizing groups that render the colorant soluble in water. The resulting macromolecular chromophore (MMC) is water-soluble, with its solubility being similar to that of well-known, commercially used water-soluble acidic and basic dyes.

These water-soluble black chromophores are made from commercially available pigments obtained from colorant vendors such as Cabot Corp. and Orient Chemical. Many pigments are useful in the practice of this invention. The following pigments comprise a partial list of useful colorants in this invention.

Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140, are all available from BASF Corp.

The following pigments are available from Cabot: Monarch® 1400, Monarch® 1300, Monarch® 1100, Monarch® 1000, Monarch® 900, Monarch® 880, Monarch® 800, and Monarch® 700.

The following pigments are available from Ciga-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastralt® Scarlet, Monastral® Violet R, Monastral® Red B, and Monastral® Violet Maroon B.

The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from Dupont. The following pigments are available from Heubach: Dalamar® Yellow YT-858-D and Heucophthal® Blue G XBT 583D. The following pigments are available from Hoechst: Permanent Yellow GR, Permanent Yellow G, Permanent Yellow NCG-71, Permanent Yellow GG, Hansa Yellow RA, Hansa Brillant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, Indofast® Violet. The following pigments are available from Sun Chem: L74-1357 Yellow, L75-1331 Yellow, and L75-2577 Yellow.

Modification imparting Water-solubility—The MMCs herein are modified by the addition of one or more organic groups comprising at least one aromatic group or a C1–C12 alkyl group and at least one ionic group or ionizable group. The ionizable group is one that forms in ionic groups in the aqueous medium. The ionic group may be anionic or cationic. The aromatic groups may be further substituted or unsubstituted. Examples include phenyl or a napthyl groups and the ionic group is sulfonic acid, sulfinic acid, phosphonic acid, carboxylic acid, ammonium, quaternary ammonium, or phosphonium group.

Depending on the process selected, the MMC can either be anionic or cationic in character. As commercially available, the anionic chromophores are usually associated with sodium or potassium cations, and the cation chromophores are usually associated with chloride or sulfate anions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid, metanilic acid, 3,5-aminoisophathalic acid, and 3,4,5-aminobenzenetricarboxylic acid.

Ammonium, quaternary ammonium groups, quaternary phosphonium groups, and protonated amine groups represent examples of cationic groups that can be attached to the same organic groups discussed above.

See U.S. Pat. Nos. 5,707,432; 5,630,868; 5,571,311; and 5,554,739 for a discussion of modified carbon black pigments and methods of attaching the functionalized groups.

Second Modification: Adding Polymers to MMCs—After modification by the addition of water-soluble functional groups, the MMCs are further modified by subsequent reactions which result in covalently attaching polymers by nucleophilic substitution on the MMC.

Thus, the above pigments are further modified by covalently attaching groups which can undergo nucleophilic substitution or acylation reactions, such as small alkyl chain esters (methyl or ethyl) and activated esters (orthopentachlorophenol and N-hydroxylsuccimide).

The attached groups are represented by the following:

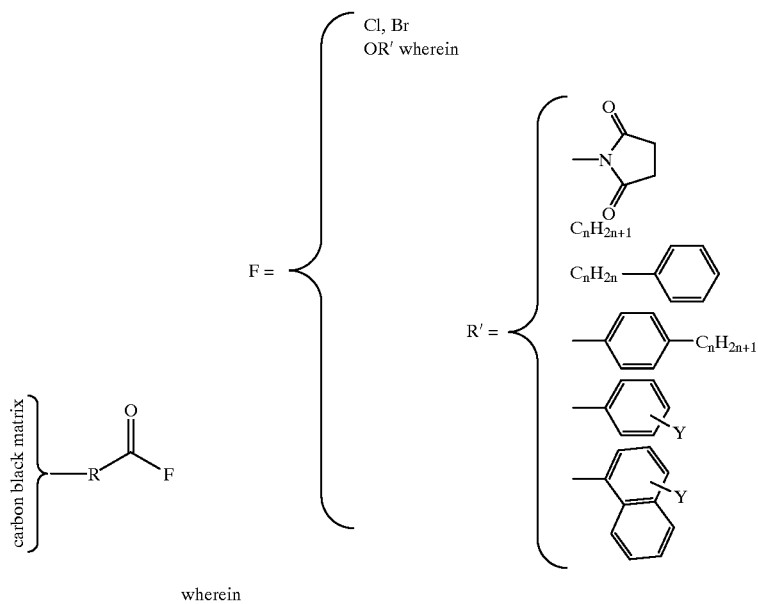

wherein

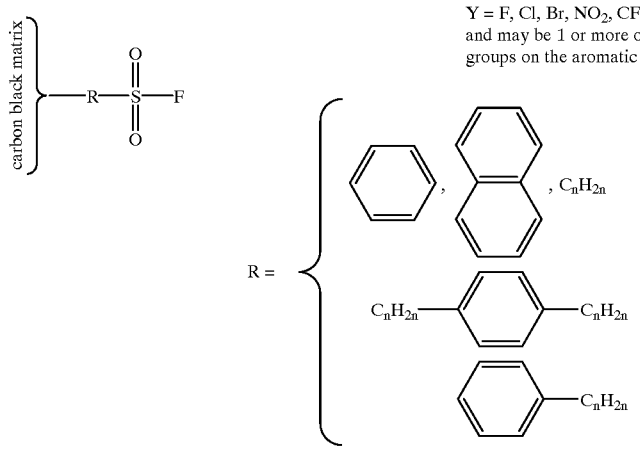

-continued
Y = F, Cl, Br, NO$_2$, CF$_3$, CH$_3$, OCH$_3$,
and may be 1 or more of the above
groups on the aromatic nucleus where in any position can be substituted n = 0 to 10

Polymer Attachment—Use of tan above chromophores which already have the functional groups covalently attached to the pigment allows for the polymer reaction to take place in water. The placement of the ester groups on the pigment also allows for attachment of the polymer at specific sites rather than nonspecific absorption onto the pigment surface. The process for attaching the polymers onto the pigments generally takes place by nucleophilic substitution (preferably general based catalyzed or by transitional metal complexes) of the ester functional groups. Either hydroxyl- or amine-terminate polymers are used for the polymerization. Thus, the polymers are covalently attached to the pigment, not merely associated with the pigment by van der Waals or London dispersion forces.

Suitable polymers include polyethylene glycols (PEG), polypropylene glycol (PPG), polytetramethylene glycol (PTHF) and other higher homologs; monoalkyl ethers of PEG, PPG, and PTHF, where the alkyl group is from 1 to 10 carbons; monoaryl ethers of PEG, PPG, and PTHF, where the alkyl group is from 1 to 10 carbons; methoxy-PEG-amine; polyvinyl alcohol and copolymers of poylvinyl alcohol and polyvinyl acetate, poly(2-hydroxylethyl) methylacrylate; poly(2-hydroxyl) methacrylate; polyethyleneimine (PEI) and hydroxylated PEI; poly(2-aminoethyl) methacrylate; poly(2-aminopropyl) methacrylate; poly(N-methyl aminoethyl) methacrylate; and poly(N-methyl aminopropyl) methacrylate. The polymers should have at least on amine or hydroxyl terminus.

Structures of preferred pre-formed polymers are shown below.

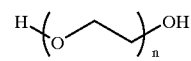
Polyethylene glycol, M$_n$200–10,000

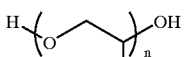
Polypropylene glycol, M$_n$425–4,000

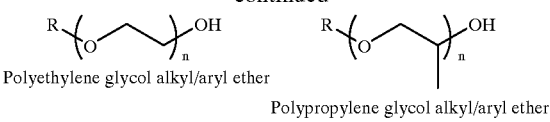
Polyethylene glycol alkyl/aryl ether    Polypropylene glycol alkyl/aryl ether

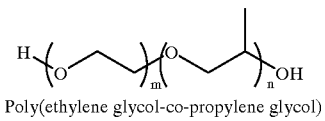
Poly(ethylene glycol-co-propylene glycol)

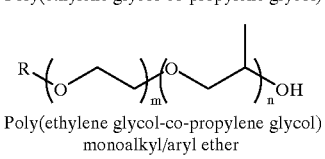
Poly(ethylene glycol-co-propylene glycol)
monoalkyl/aryl ether

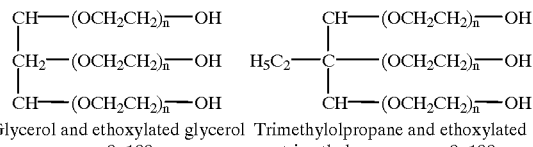
Glycerol and ethoxylated glycerol    Trimethylolpropane and ethoxylated
n = 0–100    trimetholpropane, n = 0–100

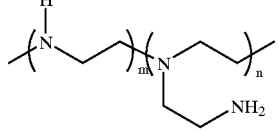
Polyethylenimines and
the ethoxylated form

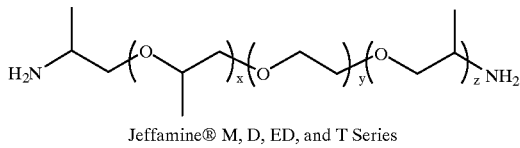
Jeffamine® M, D, ED, and T Series
polyoxyalkyleneamines

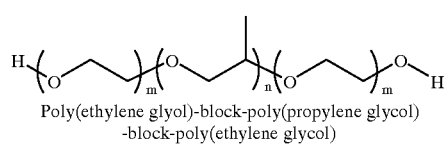
Poly(ethylene glyol)-block-poly(propylene glycol)
-block-poly(ethylene glycol)

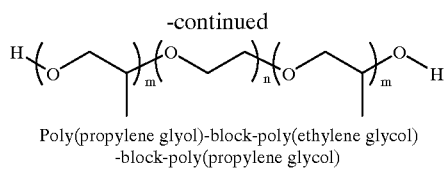

Poly(propylene glyol)-block-poly(ethylene glycol)
-block-poly(propylene glycol)

Other preferred polymers are shown below.

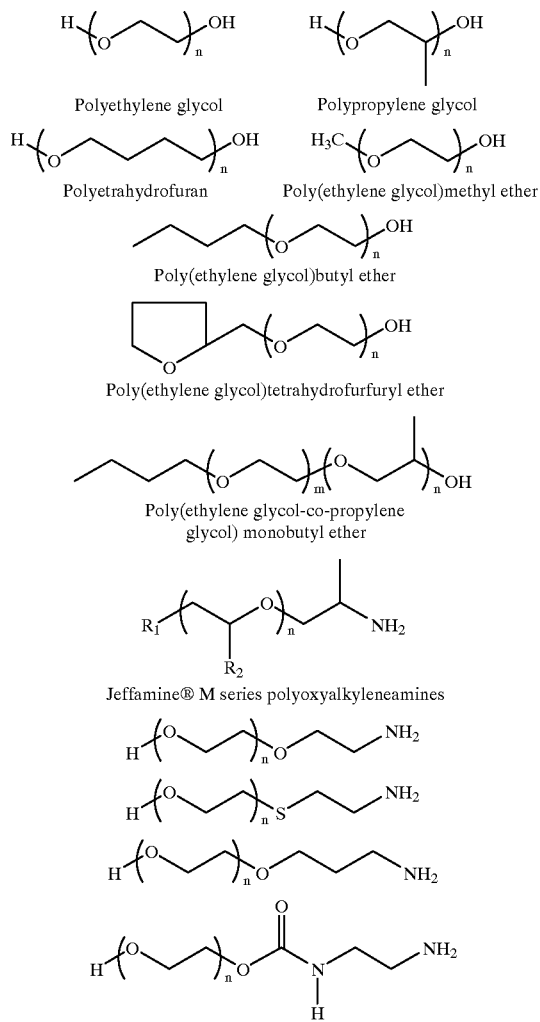

Amino-terminated PEG and methoxy-PEG (Shearwater Polymers)

Ink-jet Ink Vehicle—The ink compositions of this invention comprise the modified MMC colorants above plus a vehicle. For a discussion of inks and their properties, see *The Printing Manual, 5th* ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes the MMC (about 0.001% to 10 wt %), one or more cosolvents (0.01 to about 50 wt %), one or more water-soluble surfactants/amphiphiles (0 to about 40, preferably about 0.1 to about 5 wt %), one or more high molecular weight colloids (0 to about 3 wt %), and water (balance).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3 -propanediol, diethylenc glycol, 3-methoxybutanol, and 1,3-dimethyl-2-imidazolidinone. The cosolvent concentration may range from about 0.01 to about 50 wt %, with about 0.1 to 15 wt % being preferred.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols. Ionic surfactants such as substituted amine oxides are useful in the practice of this invention. U.S. Pat. No. 5,106,416, discloses more fully most of the surfactants listed above. The non-ionic amphiphiles/surfactants are more preferred than the ionic surfactants. Specific examples of amphiphilies/surfactants that are preferably employed in the practice of this invention include iso-hexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %.

To further improve optical density, between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from about 0.1% to about 0.75 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the MMC colorants disclosed herein. For ink formulations which employee MMCs having carboxylate functionalities, the pH is from about 7 to about 12. For sulfonate or cationic functionalities, the pH ranges from about 3 to about 12, preferably the pH is from about 5 to about 9. The viscosity of the final ink composition is from about 0.8 to about 8 cps, preferably from about 0.9 to about 4 cps.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

EXAMPLES

The ester-containing MMCs of the present invention are typically prepared in two steps: 1) covalent attachment of the water-solubilizing group on commercially available carbon black pigments and 2) covalent attachment of aryl benzoate groups. During the synthesis of the MMCs, mixing under high shear maximizes the mixing efficiency. Examples of suitable high shear mixers include attritors, homogenizers, microfluidizers, acute pressure valves, two or three roll mills, and sonicators.

Example 1

Preparation of a carbon black with benzenesulfonic acid and ethyl benzoate functional groups To reaction vessel containing a solution of 10.4 g sulfanilic acid (SA) in 658.1 g water is added 200 g Monarch 700 carbon black. The suspension is cooled to 5° C., and a solution of 4.14 g sodium nitrite in 200.0 g water is added over a period of 1 hour, forming 4-sulfobenzenediazonium salt in situ which reacts with carbon black. The mixture is heated at 70° C. for 8 hrs, and copious amounts of nitrogen evolves from the mixture. It is then concentrated and dried at 100° C. to complete the reaction. The mixture is washed with hot ethanol (or preferably soxhlet extracted with ethanol) and filtered through membrane filter to afford a SA treated MMC solution at about 20 wt %.

The diazonium salt of ethyl aminobenzoate is prepared as described above from 5.0 g ethyl p-aminobenzoate, 2.1 g sodium nitrite, 2.7 g concentrate nitric acid, and 404.7 g water. A 500.0 g of sulfanilic acid treated MMC solution is added to the diazonium salt solution and it is allowed to react for 18 hr. The solution is filtered to provide MMC solution at about 12 wt %. This MMC contains both attached p-benzenesulfonate and ethyl p-benzenecarboxylate on the particle.

Example 2

Preparation of a carbon black with benzenecarboxylic acid and ethyl benzoate functional groups To reaction vessel containing a solution of 21.94 g p-aminobenzoic acid (PABA), 14.40 g concentrate nitric acid and 767.92 g water is added 200 g Monarch 700 carbon black. The suspension is cooled to 5° C., and a solution of 11.04 g sodium nitrite and 200 g water is added over a period of 1 hour, forming 4-benzenecarboxylatediazonium salt in situ which reacts with carbon black. The mixture is heated at 70° C. for 8 hrs, and copious amounts of nitrogen evolves from the mixture. It is then concentrated and dried at 100° C. to complete the reaction. The mixture is washed with hot ethanol (or preferably soxhlet extracted with ethanol) and redissolved in water to afford a PABA treated MMC solution at about 15 wt %.

The diazonium salt of ethyl aminobenzoate is prepared as described above from 4.96 g ethyl p-aminobenzoate, 2.07 g sodium nitrite, 2.70 g concentrate nitric acid, and 397.94 g water. A 500.0 g of PABA (para-aminobenzoic acid) treated MMC solution is added to the diazonium salt solution and it is allowed to react for 18 hr. The solution is filtered to provide MMC solution at about 12 wt %. This MMC contains both attached p-benzenecarboxylate and ethyl p-benzenecarboxylate on the particle.

MMCs shown in examples 1 and 2 are further derivatized with polymer onto the surface to affect specific printing performance including bleed control, waterfastness and smearfastness. Using nucleophilic substitution, preformed polymers with amine and alchohol termini are reacted with the ester functional group to enable covalent attachment of polymer chains. Some of these polymers possess surface active property, for example, Pluronics surfactants (Rhone-Poulenc) which consist of block copolymers of polyethylene glycol and polypropylene glycol. Suitable polymers are showed below.

Examples of polymer attachment on MMC are shown below.

Example 3

MMC with attached poly(ethylene oxide/propylene oxide benzamide) and benzenesulfonic acid A 500 g of 12 wt % solution of MMC with attached benzenesulfonic acid and ethyl benzoate groups (example 1) is concentrated under reduced pressure to 20 wt %. A solution of 22.50 g Jeffamine XTJ 506 (MW 1000), and 0.34 g 1,8-diazabicyclo[5.4.0]undec-7-ene, in 100 g ethanol is added to 250 g of the above MMC solution for over a period of 1 hr. The mixture is refluxed while the pH of solution is at about 10. After 24 hour the mixture is concentrated under reduced pressure, and the solid is thoroughly washed with ethanol, or preferably soxhlet extraction with ethanol. The ethanol solution is concentrated and analyzed for unreacted Jeffamine, where 3 wt % is found. It is assumed that 97% of Jeffamine are covalently attached to MMC.

The purified material is redissolved in water, filtered through membrane filter to provide a 15 wt % solution. This colorant contains benzenesulfonic acid and ethylene oxide/propylene oxide benzamide functional groups attached on the MMC surface.

Example 4

MMC with attached poly(ethylene oxide benzoate) and benzenesulfonic acid

A solution of 45.00 g polyethylene glycol (MW 2000), and 0.34 g 1,8-diazabicyclo[5.4.0]undec-7-ene, in 100 g ethanol is added to a 20 wt % MMC with attached benzenesulfonic acid and ethyl benzoate groups for over a period of 1 hr. The mixture is refluxed while the pH of solution is at about 10. After 24 hour the mixture is concentrated under reduced pressure, and the solid is thoroughly washed with ethanol, or preferably soxhlet extraction with ethanol. The ethanol solution is concentrated and analyzed for unreacted PEG, where 11 wt % is found. It is assumed that 89% of PEG are covalently attached to MMC.

The purified material is then redissolved in water, filtered through membrane filter to provide a 15 wt % solution. This colorant contains benzenesulfonic acid and poly(ethylene oxide benzoate) functional groups attached on the MMC surface.

| Example | MMC functionality | Added polymer | Base Catalyst |
|---------|-------------------|---------------|---------------|
| 5 | BS-EB | JeffamineXTJ 234 (MW 3000) | DBU |
| 6 | BA-EB | JeffamineXTJ 506 (MW 1000) | DBU |
| 7 | BS-EB | PEG 2000 | NMM |
| 8 | BS-EB | PEG 5000 | DBU |
| 9 | BA-EB | PEG 2000 | DBU |

BS-EB = benzenesulfonic acid & ethyl benzoate; BA-EB = benzenecarboxylic acid & ethyl benzoate;
DBU = 1,8-diazabicyclo[5.4.0]undec-7-ene, NMM = N-methyl morpholine

Example 10

An inkjet ink composition for use in a thermal ink-jet printer

An ink composition is made by mixing the following:

| Component | percent (wt %) |
|-----------|----------------|
| Glycerol | 5 |
| Sulfolane | 5 |
| MMC* | 3.5 |
| Water | Balance |

*MMC as exemplified in Examples 1–9.

The mixture is brought to a pH of approximately 8.5 by the addition of NaOH as needed.

INDUSTRIAL APPLICABILITY

The inclusion of the modified pigments described above is expected to find use in inks employed in ink-jet printing.

What is claimed is:

1. An ink-jet ink composition comprising a macromolecular chromophore, wherein said macromolecular chromophore comprises:
   (a) at least one water-solubilizing functional group wherein said water-solubilizing functional group comprises at least one aromatic group or a $C_1$ to $C_{12}$ alkyl groups having attached at least one ionizable group; and
   (b) at least one polymer wherein said polymer is covalently attached to said macromolecular chromophore by nucleophilic substitution or acylation reactions through ester groups having the structures:

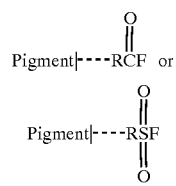

wherein F is Cl, Br, or OR', wherein R' is

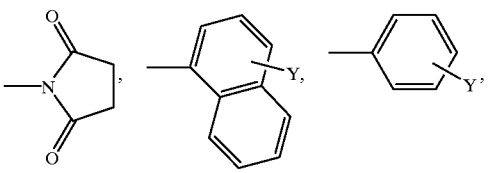

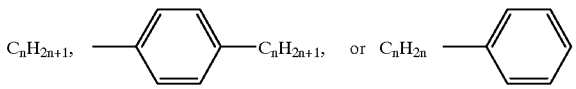

Y is independently F, Cl, Br, $NO_2$, $CF_3$, $CH_3$, or $OCH_3$, and R is

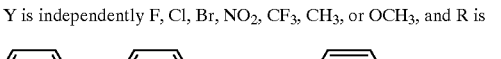

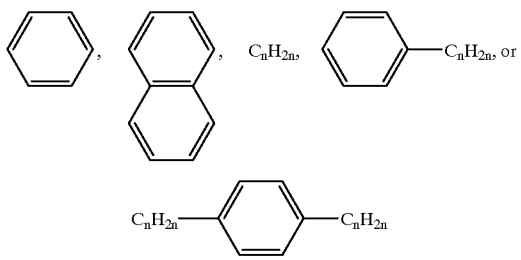

wherein any position on the aromatic nucleus can be substituted, and n is from 0 to 10; and wherein the attachments to said macromolecular chromophore are made in at least two steps:

a) attaching said water-solubilizing functional group to said macromolecular chromophore and subsequently b) covalently attaching said polymer to said macromolecular chromophore by nucelophilic substitution.

2. An ink composition according to claim 1 wherein said ionizable group is selected from the group consisting of sulfonic acid, sulfinic acid, phosphonic acid, carboxylic acid, ammonium, quaternary ammonium, phosphonium, and mixtures thereof.

3. An ink composition according to claim 1 wherein said water-soluble functional groups and said ester groups comprise from about 0.001 mmol/g to about 10 mmol/g of said macromolecular chromophore.

4. An ink composition according to claim 1 wherein said polymers attached to said ester groups are selected from the group consisting of polyethylene glycols (PEG), polypropylene glycol (PPG), polytetramethylene glycol (PTHF), and their higher homologs; monoalkyl ethers of PEG, PPG, and PTHF, where the alkyl group is from 1 to 10 carbons; monoaryl ethers of PEG, PPG, and PTHF, where the alkyl group is from 1 to 10 carbons; methoxy-PEG-amine; polyvinyl alcohol, copolymers of polyvinyl alcohol and polyvinyl acetate; poly(2-hydroxylethyl) methylacrylate; poly(2-hydroxyl) methacrylate; polyethyleneimine (PEI); hydroxylated PEI; poly(2-aminoethyl) methacrylate; poly (2-aminopropyl)methacrylate; poly(N-methyl aminoethyl) methacrylate; poly(N-methyl aminopropyl) methacrylate; and mixtures thereof.

5. The ink composition of claim 4 wherein said polymers have at least one amine or hydroxyl terminus.

6. An ink composition according to claim 1 wherein said polymers attached to said ester groups are selected from the group consisting of

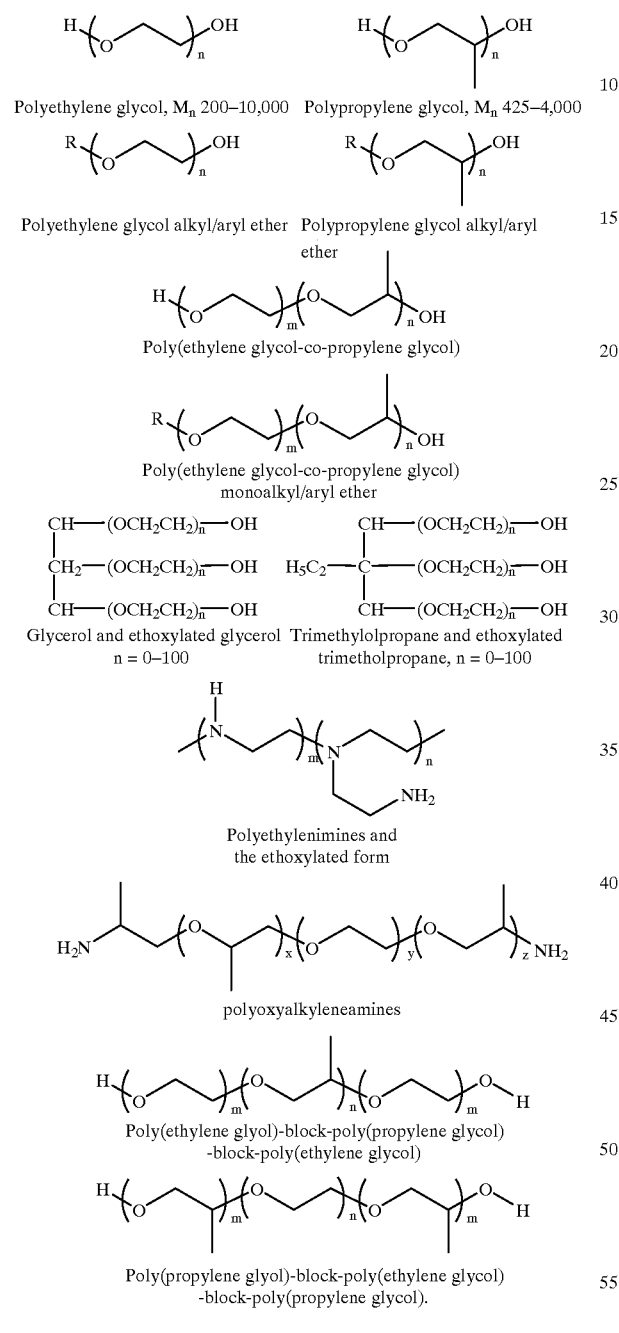

7. An ink composition according to claim 1 wherein said polymers attached to said ester groups are selected from the group consisting of

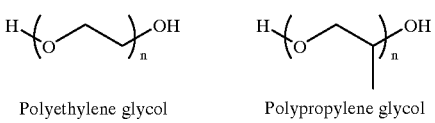

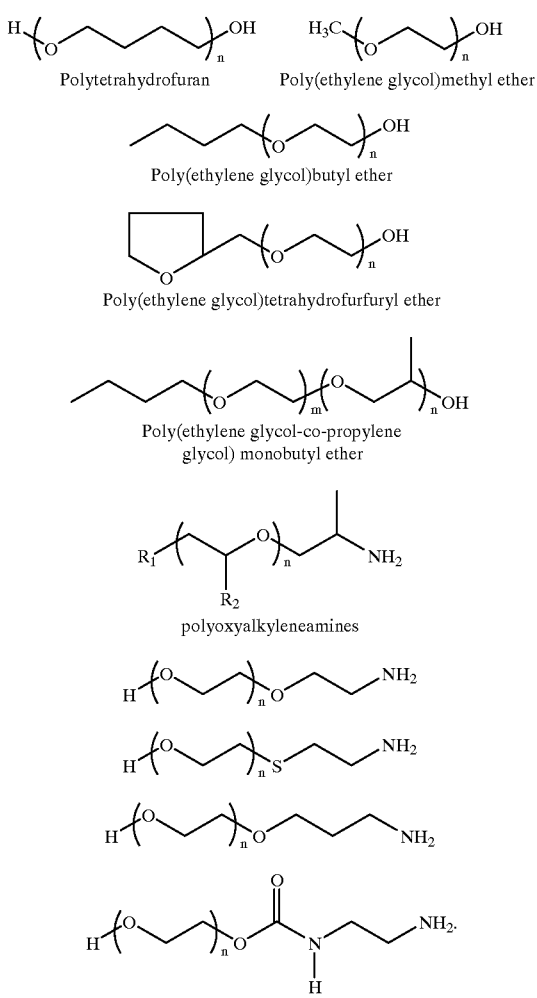

8. An ink composition for use in ink-jet printing comprising:

a) from about 0.001% to about 10 wt % of a macromolecular wherein said macromolecular chromophore comprises:

(i) at least one water-solubilizing functional group wherein said water-solubilizing functional group comprises at least one aromatic group or a $C_1$ to $C_{12}$ alkyl groups having attached at least one ionizable group; and (ii) at least one polymer wherein said polymer is covalently attached to said macromolecular chromophore by nucleophilic substitution or acylation reactions through ester soups having the structures:

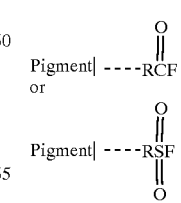

-continued
wherein F is Cl, Br, or OR', wherein R' is

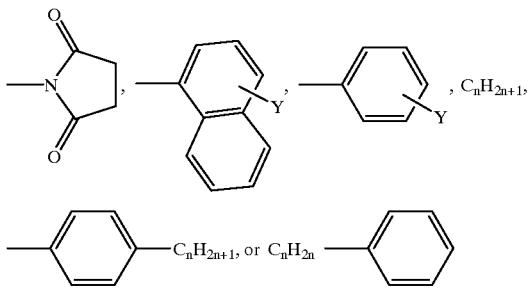

Y is independently F, Cl, Br, NO$_2$, CF$_3$, CH$_3$, or OCH$_3$, and R is

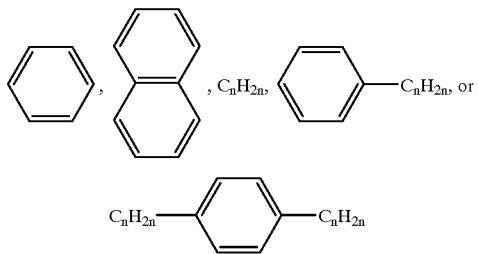

wherein any position on the aromatic nucleus can be substituted, and n is from 0 to 10, and
wherein the attachments to said macromolecular chromophore are made in at least two steps:
    1) attaching said water-solubilizing functional group to said macromotecular chromorhore and subsequently
    2) covalently attaching said polymer to said macromolecular by nucelophilic substitution;
  b) from about 0.01% to about 50 wt % of one or more cosolvents;
  c) from 0% to about 40 wt % of one or more water-soluble surfactants/amphiphiles; and
  d) from 0% to about 3 wt % of one or more high molecular weight colloid.

9. An ink composition according to claim 8 wherein said ionizable group is selected from the group consisting of sulfonic acid, sulfinic acid, phosphonic acid, carboxylic acid, ammonium, quaternary ammonium, phosphonium, and mixtures thereof.

10. An ink composition according to claim 9 wherein said water-soluble functional groups and said ester groups comprise from about 0.001 mmol/g to about 10 mmol/g of said macromolecular chromophore.

11. An ink composition according to claim 9 wherein said polymers attached to said polyolefinic groups are selected from the group consisting of polyethylene glycols (PEG), polypropylene glycol (PPG), polytetramethylene glycol (PTHF), and their higher homologs; monoalkyl ethers of PEG, PPG, and PTHF, where the alkyl group is from 1 to 10 carbons; monoaryl ethers of PEG, PPG, and PTHF, where the alkyl group is from 1 to 10 carbons; methoxy-PEG-amine; polyvinyl alcohol, copolymers of polyvinyl alcohol and polyvinyl acetate; poly(2-hydroxylethyl) methylacrylate; poly(2-hydroxyl) methacrylate; polyethyleneimine (PEI); hydroxylated PEI; poly(2-aminoethyl) methacrylate; poly(2-aminopropyl)methacrylate; poly(N-methyl aminoethyl) methacrylate; poly(N-methyl aminopropyl) methacrylate; and mixtures thereof.

12. The ink composition of claim 11 wherein said polymers have at least one amine or hydroxyl terminus.

13. An ink composition according to claim 8 wherein said ink composition has a pH of from about 5 to about 9.

14. A method of ink-jet printing comprising printing on a medium an ink-jet ink composition comprising a macromolecular chromophore wherein said macromolecular chromophore comprises;
  (i) at least one water-solubilizing functional group wherein said water-solubilizing functional group comprises at least one aromatic group or a C$_1$ to C$_{12}$ alkyl groups having attached at least one ionizable group; and
  (ii) at least one polymer wherein said polymer is covalently attached to said macromolecular chromophore by nucleophilic substitution or acylation reactions through ester groups having the structures:

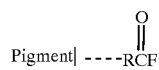

or

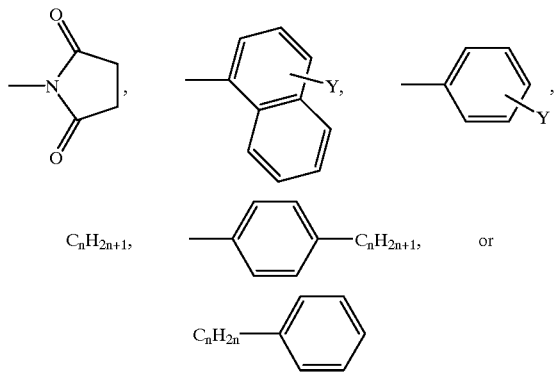

wherein F is Cl, Br, or OR', wherein R' is
Y is independently F, Cl, Br, NO$_2$, CF$_3$, CH$_3$, or OCH$_3$, and R is

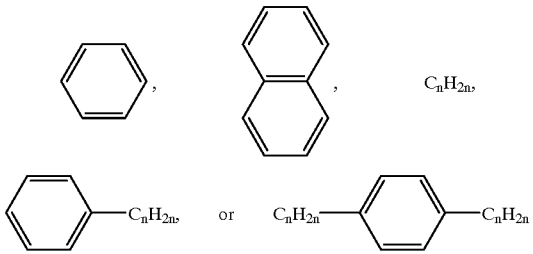

wherein any position on the aromalic nucleus can be substituted, and n is from 0 to to 10, and
wherein the attachments to said macromolecular chromophore are made in at least two steps:
  a) attaching said water-solubilizing functional group to said macromolecular chromophore and subsequently
  b) covalently attaching said polymer to said macromolecular chromophore by nucleophilic substitution.

15. A method of ink-jet printing according to claim 14 wherein said ionizable group is selected from the group consisting of sulfonic acid, sulfinic acid, phosphonic acid, carboxylic acid, ammonium, quaternary ammonium, phosphonium, and mixtures thereof.

16. A method of ink-jet printing according to claim 14 wherein said water-soluble functional groups and said ester groups comprise from about 0.001 mmol/g to about 10 mmol/g of said macromolecular chromophore.

17. A method of ink-jet printing according to claim 16 wherein said polymers attached to said ester groups are selected from the group consisting of polyethylene glycols (PEG), polypropylene glycol (PPG), polytetramethylene glycol (PTHF), and their higher homologs; monoalkyl ethers of PEG, PPG, and PTHF, where the alkyl group is from 1 to 10 carbons; monoaryl ethers of PEG, PPG, and PTHF, where the alkyl group is from 1 to 10 carbons; methoxy-PEG-amine; polyvinyl alcohol, copolymers of polyvinyl alcohol and polyvinyl acetate; poly(2-hydroxylethyl) methylacrylate; poly(2-hydroxyl) methacrylate; polyethyleneimine (PEI); hydroxylated PEI; poly(2-aminoethyl) methacrylate; poly(2-aminopropyl)methacrylate; poly(N-methyl aminoethyl) methacrylate; poly(N-methyl aminopropyl) methacrylate; and mixtures thereof.

18. A method of ink-jet printing according to claim 17 wherein said polymers have at least one amine or hydroxyl terminus.

19. A method of ink-jet printing comprising printing on a medium an ink composition comprising:
 a) from about 0.001% to about 10 wt % of a macromolecular chromophore wherein said macromolecular chromophore comprises
  (i) at least one water-solubilizing functional group wherein said water-solubilizing functional group comprises at least one aromatic group or a $C_1$ to $C_{12}$ alkyl groups having attached at least one ionizable group; and
  (ii) at least one polymer wherein said polymer is covalently attached to said macromolecular chromophore by nucleophilic substitution or acylation reactions through ester groups having the structures:

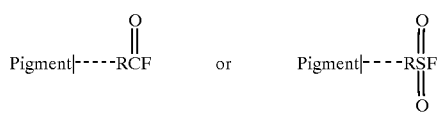

wherein F is Cl, Br, or OR', wherein R' is

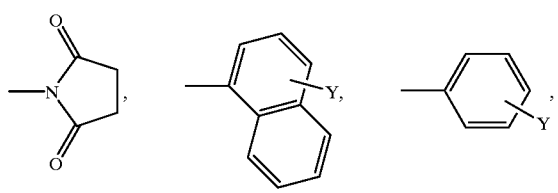

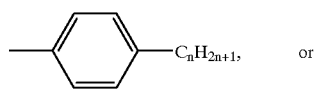

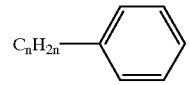

Y is independently F, Cl, Br, $NO_2$, $CF_3$, $CH_3$, or $OCH_3$, and R is

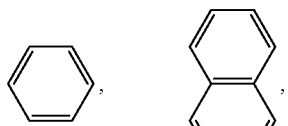

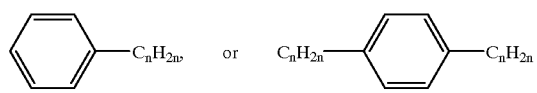

wherein any position on the aromatic nucleus can be substituted, and n is from 0 to 10, and wherein the attachments to said macromolecular chromophore are made in at least two steps:

a) attaching said water-solubilizing functional group to said macromolecular chromorhore and subsegently b) covalently attaching said polymer to said macromolecular chromophore by nucleophilic substitution;

b) from about 0.01% to about 50 wt % of one or more cosolvents;

c) from 0% to about 40 wt % of one or more water-soluble surfactants/amphiphiles; and d) from 0% to about 3 wt % of one or more high molecular weight colloid.

20. A method of ink-jet printing comprising printing according to claim 19 wherein said ink composition has a pH of from about 5 to about 9.

* * * * *

UNITED STATES PATENT AND TRADEMARK OFFICE
CERTIFICATE OF CORRECTION

PATENT NO.    : 6,221,932 B1                                    Page 1 of 1
DATED         : April 24, 2001
INVENTOR(S)   : Moffatt et al.

It is certified that error appears in the above-identified patent and that said Letters Patent is hereby corrected as shown below:

<u>Column 16,</u>
Line 57, "aromalic" should read -- aromatic --;
Line 58, "to to" should read -- to --;

<u>Column 18,</u>
Line 41, "subsegently" should read -- subsequently --.

Signed and Sealed this

Eighteenth Day of March, 2003

JAMES E. ROGAN
*Director of the United States Patent and Trademark Office*